(12) United States Patent
Kitsukawa et al.

(10) Patent No.: US 9,334,833 B2
(45) Date of Patent: May 10, 2016

(54) TURBOCHARGER SYSTEM

(75) Inventors: Isao Kitsukawa, Fujisawa (JP);
Tomohiro Sugano, Fujisawa (JP);
Yoshiyuki Abe, Fujisawa (JP); Haruyo Kimura, Fujisawa (JP); Akira Iijima, Fujisawa (JP); Naoki Ishibashi, Fujisawa (JP); Syougo Sakashita, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 237 days.

(21) Appl. No.: 13/881,103

(22) PCT Filed: Oct. 24, 2011

(86) PCT No.: PCT/JP2011/074411
§ 371 (c)(1),
(2), (4) Date: Apr. 23, 2013

(87) PCT Pub. No.: WO2012/057065
PCT Pub. Date: May 3, 2012

(65) Prior Publication Data
US 2013/0199179 A1 Aug. 8, 2013

(30) Foreign Application Priority Data
Oct. 28, 2010 (JP) ................................. 2010-242530

(51) Int. Cl.
*F02B 33/44* (2006.01)
*F02M 25/07* (2006.01)
(Continued)

(52) U.S. Cl.
CPC .............. *F02M 25/07* (2013.01); *F02B 37/004* (2013.01); *F02B 37/013* (2013.01); *F02B 37/10* (2013.01); *F02B 39/10* (2013.01); *F02D 21/08* (2013.01); *F02D 23/00* (2013.01); *Y02T 10/144* (2013.01)

(58) Field of Classification Search
CPC ..... Y02T 10/144; Y02T 10/121; Y02T 10/47; F02B 39/10; F02B 37/013; F02D 41/0007; F02D 21/08; F02D 23/00; F02M 25/0707; F02M 25/0711
USPC .......... 60/602, 605.2, 608, 273, 612; 123/562
See application file for complete search history.

(56) References Cited

U.S. PATENT DOCUMENTS 4,958,497 A * 9/1990 Kawamura ............ F02B 37/013
60/608
8,033,108 B2 * 10/2011 Ishikawa et al. ................. 60/602
(Continued)

FOREIGN PATENT DOCUMENTS

JP 2006-177171 7/2006
JP 2009-270475 11/2009
(Continued)

OTHER PUBLICATIONS

Written Opinion of the International Searching Authority mailed Nov. 15, 2011 in corresponding International Application No. PCT/JP2011/074411.
(Continued)

*Primary Examiner* — Thomas Denion
*Assistant Examiner* — Thomas Olszewski
(74) *Attorney, Agent, or Firm* — Staas & Halsey LLP

(57) ABSTRACT

A turbocharger system for ensuring a sufficient exhaust gas recirculation ("EGR") amount in all operating conditions, and reducing NOx emission from an engine. The system includes an EGR controller that re-circulates a part of exhaust gas discharged from the engine to an intake side. The turbocharger is a power-assisted turbocharger including an electric motor that assists a drive force of a compressor. The EGR controller controls an amount of exhaust gas recirculated to the intake side so as to inhibit the generation of NOx regardless of an amount of oxygen necessary for combustion of the engine. An electric motor control unit drives the electric motor, by the control of the EGR controller, when the amount of oxygen necessary for the combustion of the engine is deficient.

4 Claims, 2 Drawing Sheets

(51) Int. Cl.
*F02B 37/013* (2006.01)
*F02B 37/10* (2006.01)
*F02B 39/10* (2006.01)
*F02D 21/08* (2006.01)
*F02D 23/00* (2006.01)
*F02B 37/00* (2006.01)

(56) References Cited

U.S. PATENT DOCUMENTS

| | | | |
|---|---|---|---|
| 2006/0196182 A1* | 9/2006 | Kimoto | F02B 33/44 60/605.1 |
| 2008/0148727 A1* | 6/2008 | de Ojeda | F02B 37/013 60/602 |
| 2008/0282699 A1* | 11/2008 | Barthelet et al. | 60/608 |
| 2011/0107739 A1* | 5/2011 | Shimizu et al. | 60/273 |
| 2012/0297767 A1* | 11/2012 | Hofbauer | 60/605.2 |

FOREIGN PATENT DOCUMENTS

| | | |
|---|---|---|
| JP | 2010-96161 | 4/2010 |
| JP | 2010-209735 | 9/2010 |
| JP | 2011-80406 | 4/2011 |

OTHER PUBLICATIONS

Patent Abstracts of Japan, Publication No. 2009-270475, Published Nov. 19, 2009.

Patent Abstracts of Japan, Publication No. 2006-177171, Published Jul. 6, 2006.

Patent Abstracts of Japan, Publication No. 2010-209735, Published Sep. 24, 2010.

Patent Abstracts of Japan, Publication No. 2011-080406, Published Apr. 21, 2011.

Seiichi Ibaraki et al., "Development of the "hybrid turbo," an electrically assisted turbocharger", Mitsubishi Heavy Industries, Ltd. Technical Review, vol. 43 No. 3, Sep. 2006, pp. 36-40.

International Search Report of PCT/JP2011/074411 mailed Nov. 15, 2011.

* cited by examiner

TURBOCHARGER SYSTEM

CROSS REFERENCE TO RELATED APPLICATIONS

This application claims the foreign priority benefit of Japanese Application No. 2010-242530 filed Oct. 28, 2010, the contents of which are incorporated herein by reference, which serves as priority for PCT Application No. JP2011/074411 filed Oct. 24, 2011.

Technical Field

The present invention relates to a turbocharger system in which a high-pressure stage turbocharger and a low-pressure stage turbocharger are connected in series.

Background Art

Recently, for improving vehicle fuel efficiency and reducing $CO_2$ emission, the development of technology has been actively made to reduce an engine displacement (for engine downsizing) or increase a gear ratio of a vehicle (to be high-geared) and ensure power performance by a supercharger such as a turbocharger.

As a turbocharger system used at this time, there has been proposed a two-stage turbo that uses two turbochargers having different capacities and switches a turbocharger to be used in an operating zone. As the two-stage turbo, there are a parallel two-stage turbo in which two turbochargers are connected in parallel, and a series two-stage turbo in which two turbochargers are connected in series (see, for example, Patent Document 1).

PRIOR ART DOCUMENTS

Patent Document 1: JP 2009-270475 A
Patent Document 2: JP 2006-177171 A
Patent Document 3: JP 2010-209735 A
Non Patent Document 1: Development of Power-Assisted Turbocharger "Hybrid Turbo", Seiichi IBARAKI and four others, Mitsubishi Heavy Industries Technical Review, Vol. 43, No. 3, 2006, p. 36-40

There is known an exhaust gas recirculation (EGR) control that reduces NOx by recirculating a part of exhaust gas discharged from an engine to an intake side.

In the EGR control, an EGR pipe is provided to connect an intake manifold (or intake passage) and an exhaust manifold (or exhaust passage) of an engine, and an EGR amount (or EGR rate) being an amount of exhaust gas recirculated to the intake side is controlled by adjusting an opening degree of an EGR valve provided in the EGR pipe.

In the EGR control, the generation of NOx is inhibited by recirculating a part of exhaust gas to the intake side to lower oxygen concentration of gas to be sucked into the engine, and shortening a maximum combustion temperature and a time exposed to the maximum combustion temperature. However, just by lowering the oxygen concentration, the absolute amount of oxygen necessary for the combustion in the engine becomes deficient. Therefore, it is necessary to perform control such that the intake air flow rate is increased by maintaining the boost pressure at a high level, and the oxygen concentration is lowered by increasing the EGR amount while ensuring the absolute amount of oxygen supplied to the engine.

However, in a low load zone where exhaust energy is low, or during a transient operation where a turbo rotational speed is not quickly raised by an inertia of a turbine wheel, there is a problem in that even the series two-stage turbo described above cannot obtain a sufficient boost pressure. In this situation, if the EGR amount is increased, the flow rate of the exhaust gas supplied to the turbocharger is further reduced, and the response of the turbocharger (that is, the rise in the boost pressure) is further delayed, causing a problem in the power performance of the engine.

Therefore, in order to ensure the power performance, the EGR amount cannot be increased in the low load zone or during the transient operation, resulting in an increase in the amount of NOx discharged from the engine. Since a large amount of NOx discharged from the engine cannot be directly released in the atmosphere, the purification of NOx has been generally performed using a NOx catalyst.

However, since the NOx catalyst is very expensive, the simplification or abolishment of the NOx catalyst is desired. If a sufficient EGR amount can be ensured in all operating conditions, an amount of NOx discharged from the engine becomes very small, and the simplification or abolishment of the NOx catalyst is enabled.

SUMMARY OF THE INVENTION

Therefore, an object of the present invention is to solve the above problems and provide a turbocharger system capable of ensuring a sufficient EGR amount in all operating conditions and reducing NOx emission from an engine.

The present invention was made in order to achieve the above object, and provides a turbocharger system for an engine including: an EGR controller that recirculates a part of exhaust gas discharged from the engine to an intake side; and a turbocharger including a turbine disposed on an exhaust passage and driven by exhaust, and a compressor disposed on an intake passage and driven by a rotational torque of the turbine, wherein the turbocharger includes a power-assisted turbocharger provided with an electric motor that assists a drive force of the compressor, the EGR controller controls an amount of exhaust gas recirculated to the intake side so as to inhibit the generation of NOx regardless of an amount of oxygen necessary for combustion of the engine, and an electric motor control unit is provided to drive the electric motor, by control of the EGR controller, when the amount of the oxygen necessary for the combustion of the engine is deficient.

The turbocharger is a high-pressure stage turbocharger including a high-pressure stage turbine disposed on the exhaust passage and driven by exhaust, and a high-pressure stage compressor disposed on the intake passage and driven by a rotational torque of the high-pressure stage turbine, and the turbocharger system may further include a low-pressure stage turbocharger including a low-pressure stage turbine disposed on the exhaust passage of a more downstream side than the high-pressure stage turbine and driven by exhaust, and a low-pressure stage compressor disposed on the intake passage of a more upstream side than the high-pressure stage compressor and driven by a rotational torque of the low-pressure stage turbine.

The electric motor control unit may drive the electric motor when a boost pressure being an outlet pressure of the high-pressure stage compressor is smaller than a target boost pressure set to a value that is capable of ensuring power performance of a vehicle, even when the amount of the exhaust gas recirculated to the intake side by EGR control is set as an amount that is most capable of inhibiting the generation of NOx.

The turbocharger system includes: a boost pressure sensor that measures a boost pressure being an outlet pressure of the high-pressure stage compressor; a target boost pressure map in which a target boost pressure is set for each engine speed and engine torque, considering the amount of the exhaust gas recirculated to the intake side by the EGR control; an intake air flow rate measurement unit that measures an intake air flow rate; an inlet pressure sensor that measures an inlet pressure of the high-pressure stage compressor; and a high-pressure stage compressor characteristics map that represents a relationship of a pressure ratio of the inlet pressure and the boost pressure with respect to the intake air flow rate for each turbo rotational speed in the high-pressure stage compressor, wherein the electric motor control unit may calculate a target pressure ratio from a ratio of the inlet pressure measured by the inlet pressure sensor and the target boost pressure, calculate a target turbo rotational speed by referring to the high-pressure stage compressor characteristics map at the target pressure ratio and the intake air flow rate measured by the intake air flow rate measurement unit, and control a drive amount of the electric motor according to a discrepancy between the calculated target turbo rotational speed and a current turbo rotational speed.

According to the present invention, it is possible to provide a turbocharger system capable of ensuring a sufficient EGR amount in all operating conditions and reducing NOx emission from an engine.

DETAILED DESCRIPTION

Hereinafter, an embodiment of the present invention will be described with reference to the accompanying drawings.

Figure 1:
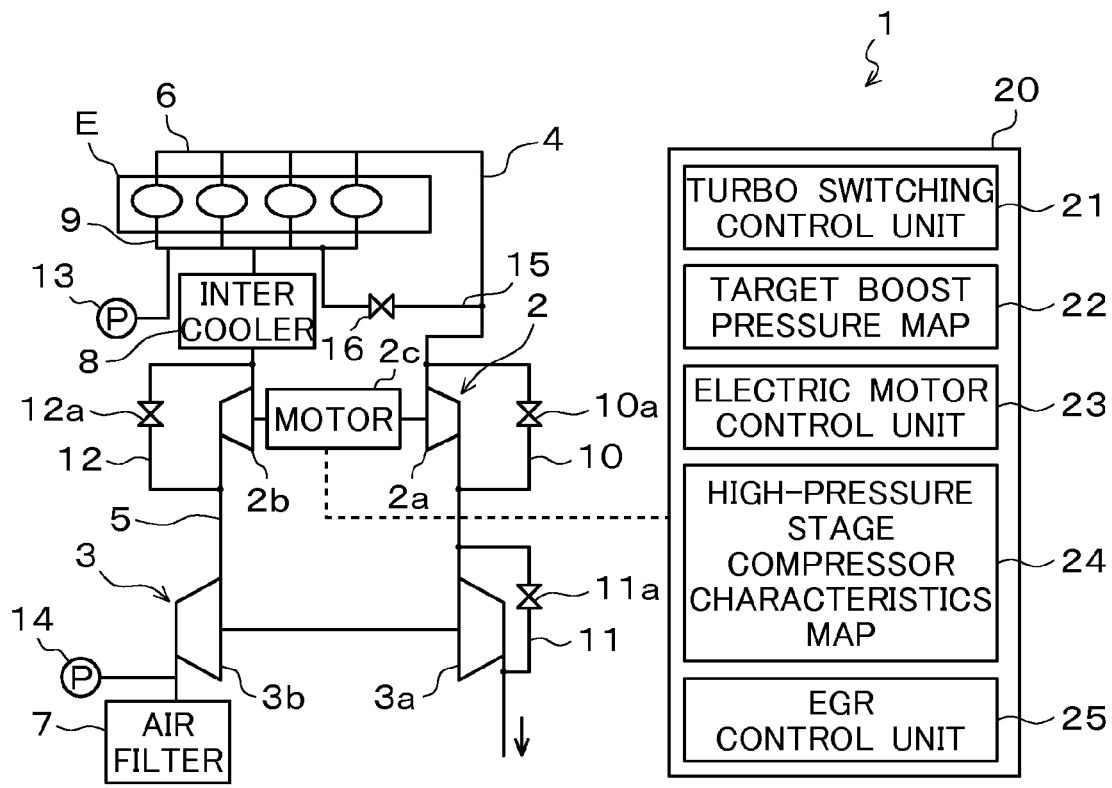
FIG. 1 is a schematic configuration diagram of an engine system using a turbocharger system according to an embodiment of the present invention.

FIG. 1 is a schematic configuration diagram of an engine system using a turbocharger system according to the present embodiment.

As illustrated in FIG. 1, the turbocharger system 1 is provided with a series two-stage turbo in which a small-sized (small-capacity) high-pressure stage turbocharger 2 and a large-sized (large-capacity) low-pressure stage turbocharger 3 are connected in series.

The high-pressure stage turbocharger 2 includes a high-pressure stage turbine 2a disposed on an exhaust passage 4 of an engine E and driven by exhaust, and a high-pressure stage compressor 2b disposed on an intake passage 5 and driven by a rotational torque of the high-pressure stage turbine 2a.

The low-pressure stage turbocharger 3 includes a low-pressure stage turbine 3a disposed on the exhaust passage 4 of a more downstream side than the high-pressure stage turbine 2a and driven by exhaust, and a low-pressure stage compressor 3b disposed on the intake passage 5 of a more upstream side than the high-pressure stage compressor 2b and driven by a rotational torque of the low-pressure stage turbine 3a.

The most upstream of the exhaust passage 4 is connected to an exhaust manifold 6 of the engine E. In the exhaust passage 4 of the downstream side, the high-pressure stage turbine 2a and the low-pressure stage turbine 3a are provided in turn. In the most upstream of the intake passage 5, an air filter 7 is provided. In the intake passage 5 of the downstream side, the low-pressure stage compressor 3b, the high-pressure stage compressor 2b, and an intercooler 8 are provided in turn. The most downstream of the intake passage 5 is connected to an intake manifold 9 of the engine E.

Also, in the exhaust passage 4, a high-pressure stage turbine bypass line 10 that bypasses the high-pressure stage turbine 2a, and a low-pressure stage turbine bypass line 11 that bypasses the low-pressure stage turbine 3a, are provided, respectively. In the high-pressure stage turbine bypass line 10 and the low-pressure stage turbine bypass line 11, a high-pressure stage turbine bypass valve 10a and a low-pressure stage turbine bypass valve 11a are provided, respectively. Also, in the intake passage 5, a high-pressure stage compressor bypass line 12 is provided to bypass the high-pressure stage compressor 2b. In the high-pressure stage compressor bypass line 12, a high-pressure stage compressor bypass valve 12a is provided.

Furthermore, the turbocharger system 1 includes a boost pressure sensor 13 that measures a boost pressure being an outlet pressure of the high-pressure stage compressor 2b, an inlet pressure sensor 14 which measures an inlet pressure of the high-pressure stage compressor 2b, and an intake air flow rate measurement unit (for example, MAF sensor), not illustrated, which measures an intake air flow rate. The boost pressure sensor 13 is provided in the intake manifold 9, and the inlet pressure sensor 14 is provided on the intake passage 5 of the upstream side of the low-pressure stage compressor 3b. Also, in a zone where the low-pressure stage turbocharger 3 is not used, such as a zone where an engine speed is within an extremely low range, a measured value of the inlet pressure sensor 14 is substantially equal to the inlet pressure of the high-pressure stage compressor 2b.

The turbocharger system 1 includes a turbo switching control unit 21 which switches the turbochargers 2 and 3 to be used according to an engine speed (engine rotational speed) and an engine torque (load). The turbo switching control unit 21 is embedded into an electronic control unit (ECU) 20 as a program.

In a zone where an engine speed is low and exhaust energy is small, the turbo switching control unit 21 closes the high-pressure stage turbine bypass valve 10a and the high-pressure stage compressor bypass valve 12a, and drives the high-pressure stage turbocharger 2. At this time, exhaust gas is also supplied to the low-pressure stage turbine 3a, and the low-pressure stage turbocharger 3 is driven by the remaining exhaust energy. However, in the zone where the engine speed is low and the exhaust energy is small, the low-pressure stage turbine 3a cannot almost work, and the high-pressure stage turbocharger 2 is almost exclusively operated.

Also, in a zone where the engine speed is high and the exhaust energy is large, the turbo switching control unit 21 opens the high-pressure stage turbine bypass valve 10a and the high-pressure stage compressor bypass valve 12a and drives only the low-pressure stage turbocharger 3 by closing the low-pressure stage turbine bypass valve 11a, so as to suppress the deterioration of the fuel efficiency due to the over speed of the high-pressure stage turbocharger 2 and the abnormal rise of the exhaust pressure. Also, in a zone where the engine speed becomes higher and exceeds the capacity of the low-pressure stage turbocharger 3, the low-pressure stage turbine bypass valve 11a is opened, and the deterioration of the fuel efficiency due to the over speed of the low-pressure stage turbocharger 3 and the abnormal rise of the exhaust pressure is suppressed.

Furthermore, in a middle zone between the zone where the engine speed is low and the zone where the engine speed is high, the turbo switching control unit 21 closes the low-pressure stage turbine bypass valve 11*a* and the high-pressure stage compressor bypass valve 12*a*, and adjusts an opening degree of the high-pressure stage turbine bypass valve 10*a* to drive both of the high-pressure stage turbocharger 2 and the low-pressure stage turbocharger 3 at a ratio corresponding to the opening degree of the high-pressure stage turbine bypass valve 10*a*.

Also, the turbocharger system 1 is provided with an EGR controller that recirculates a part of exhaust gas discharged from the engine to the intake side. The EGR controller includes an EGR pipe 15 that connects the exhaust passage 4 and the intake manifold 9 between the exhaust manifold 6 and the high-pressure stage turbine 2*a*, an EGR valve 16 provided in the EGR pipe 15 to adjust an EGR amount (or EGR rate) being an amount of exhaust gas recirculated to the intake side, and an EGR control unit 25 mounted on the ECU 20 to calculate an optimal target EGR amount (most capable of inhibiting the generation of NOx) according to engine parameters, such as an engine speed or a fuel injection amount, and control an opening degree of the EGR valve 16 such that the EGR amount becomes the target EGR amount. The EGR control unit 25 controls the EGR amount so as to inhibit the generation of NOx regardless of an amount of oxygen necessary for combustion of the engine E.

The turbocharger system 1 according to the present embodiment uses a power-assisted turbocharger (hybrid turbo), including an electric motor 2*c* that assists a drive force of the high-pressure stage compressor 2*b* (assists a rotational torque of the high-pressure stage turbine 2*a*), as the high-pressure stage turbocharger 2. The electric motor 2*c* is integrally provided with a turbo shaft that connects the high-pressure stage turbine 2*a* and the high-pressure stage compressor 2*b*, more particularly, a turbine wheel of the high-pressure stage turbine 2*a* and a compressor wheel of the high-pressure stage compressor 2*b*. The electric motor 2*c* includes, for example, a DC servomotor. Also, since the electric motor 2*c* is integrally provided with the turbo shaft, a rotational speed of the electric motor 2*c* is equal to a rotational speed (turbo rotational speed) of the high-pressure stage turbocharger 2.

The turbocharger system 1 is provided with an electric motor control unit 23 that drives the electric motor 2*c*, by the control of the EGR controller, when an amount of oxygen necessary for the combustion of the engine E is deficient, that is, when the boost pressure is deficient with respect to the EGR amount that is set as the EGR amount most capable of inhibiting the generation of NOx (target EGR amount) (that is, when an intake air flow rate is deficient and thus an absolute amount of oxygen is deficient).

Also, the turbocharger system 1 includes a target boost pressure map 22 in which a target boost pressure is set for each engine speed and engine torque, considering an amount of exhaust gas recirculated to the intake side by the EGR control, and the electric motor control unit 23 drives the electric motor when the boost pressure detected by the boost pressure sensor 13 is smaller than the target boost pressure obtained by referring to the target boost pressure map 22 at the engine speed and the engine torque.

Also, the turbocharger system 1 includes a high-pressure stage compressor characteristics map 24 that represents a pressure ratio of the inlet pressure and the boost pressure with respect to the intake air flow rate for each turbo rotational speed in the high-pressure stage compressor 2*b*. The electric motor control unit 23 calculates a target pressure ratio from a ratio of the inlet pressure measured by the inlet pressure sensor 14 and the target boost pressure, also calculates a target turbo rotational speed by referring to the high-pressure stage compressor characteristics map 24 at the target pressure ratio and the intake air flow rate measured by the intake air flow rate measurement unit, and controls a drive amount (assist amount) by the electric motor 2*c* according to a discrepancy between the calculated target turbo rotational speed and the current turbo rotational speed.

The target boost pressure map 22, the electric motor control unit 23, and the high-pressure stage compressor characteristics map 24 are mounted on the ECU 20. Also, in the ECU 20, all engine parameters, such as the engine speed or the fuel injection amount, are recognized so as to perform the control of the engine E.

Hereinafter, the control of the assist amount by the electric motor 2*c* will be described in detail.

In the turbocharger system 1, first, the electric motor control unit 23 calculates the target boost pressure by referring to the target boost pressure map 22 at the engine speed and the engine torque. An example of the target boost pressure map 22 used at this time is illustrated in FIG. 2.

Figure 2:
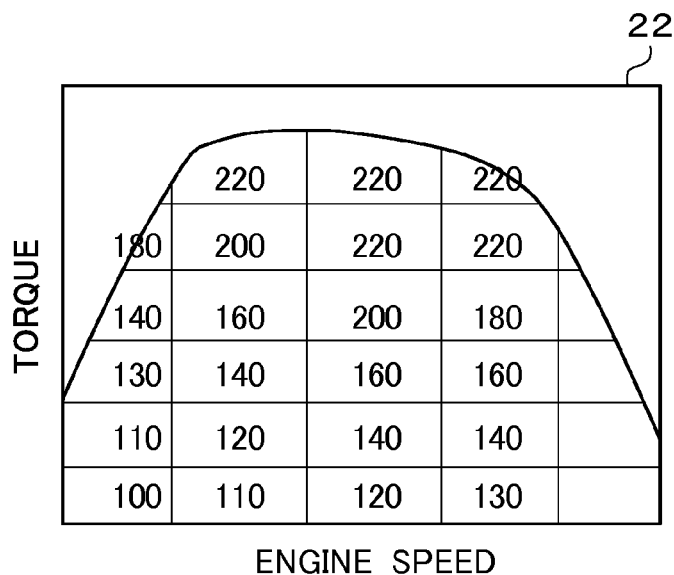
FIG. 2 is a diagram illustrating an example of a target boost pressure map used in the turbocharger system of FIG. 1.

As illustrated in FIG. 2, the target boost pressure map 22 is a map in which the target boost pressure (value represented by number in FIG. 2) is set for each engine speed and engine torque. The target boost pressure is set to a value capable of ensuring sufficient power performance, under the condition of each engine speed and engine torque, even when the EGR amount is set as the target EGR amount (EGR amount most capable of inhibiting the generation of NOx). Also, the engine torque can be calculated from the engine parameter such as the fuel injection amount.

After calculating the target boost pressure, the assist amount by the electric motor 2*c* is controlled such that the actual boost pressure becomes close to the target boost pressure. However, since the rotational speed of the electric motor 2*c* can easily be controlled, it is effective that the control of the assist amount also directs the rotational speed of the electric motor 2*c*.

More particularly, the electric motor control unit 23 calculates the target pressure ratio from the ratio of the inlet pressure measured by the inlet pressure sensor 14 and the target boost pressure, and also calculates the current pressure ratio from the ratio of the boost pressure measured by the boost pressure sensor 13 and the inlet pressure.

Also, since the inlet pressure measured by the inlet pressure sensor 14 is the inlet pressure of the low-pressure stage compressor 3*b*, both the pressure ratios calculated herein (the target pressure ratio and the current pressure ratio) are values based on the inlet-to-output pressure ratio of the low-pressure stage compressor 3*b* and the inlet-to-output pressure ratio of the high-pressure stage compressor 2*b*. However, when the low-pressure stage turbocharger 3 is in a driven state, the exhaust energy is large so that the actual boost pressure is equal to or higher than the target boost pressure. Therefore, the assist by the electric motor 2*c* is not performed in practice (although the assist by the electric motor 2*c* may be performed, the fuel efficiency is deteriorated in reverse by the power consumption). That is, the actual boost pressure is less than the target boost pressure only when the engine speed is within a low speed range. In such a range, the low-pressure stage turbocharger 3 is not driven. Therefore, the inlet pressure measured by the inlet pressure sensor 14 becomes substantially equal to the inlet pressure of the high-pressure stage compressor 2*b*. By taking the ratio of the inlet pressure to the boost pressure, the inlet-to-output pressure ratio of the high-pressure stage compressor 2*b* can be obtained.

Thereafter, the electric motor control unit 23 calculates the target turbo rotational speed by referring to the high-pressure stage compressor characteristics map 24 at the target pressure ratio and the intake air flow rate measured by the intake air flow rate measurement unit, and also calculates the current turbo rotational speed by referring to the high-pressure stage compressor characteristics map 24 at the current pressure ratio and intake air flow rate. An example of the high-pressure stage compressor characteristics map 24 used at this time is illustrated in FIG. 3.

Figure 3:
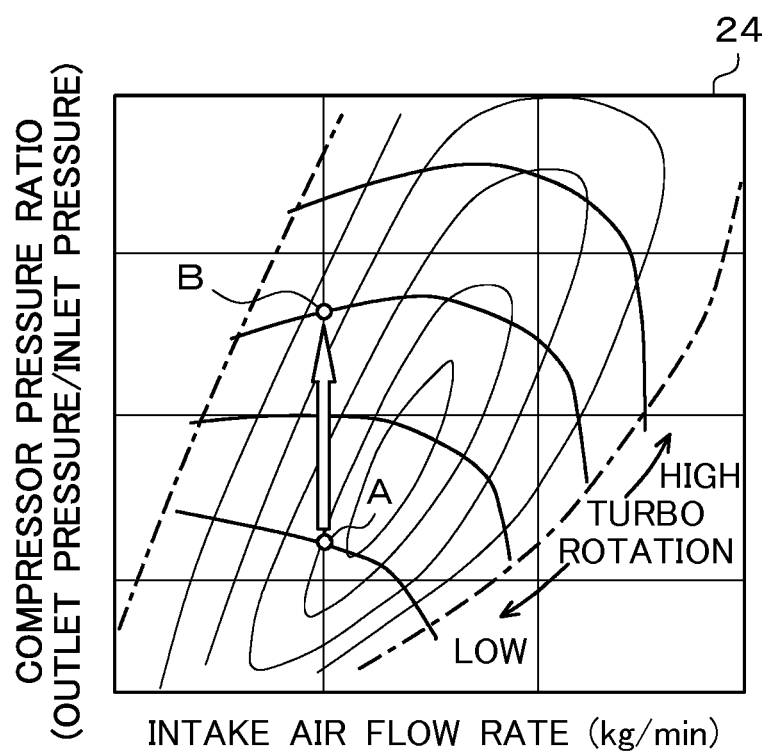
FIG. 3 is a diagram illustrating an example of a high-pressure stage compressor characteristics map used in the turbocharger system of FIG. 1.

As illustrated in FIG. 3, the high-pressure stage compressor characteristics map 24 is a map that represents a relationship between the inlet-to-outlet pressure ratio of the high-pressure stage compressor 2b and the intake air amount for each turbo rotational speed of the high-pressure stage turbocharger 2, and represents the characteristics of the high-pressure stage compressor.

In FIG. 3, for example, when the current pressure ratio and the intake air flow rate are placed at point A, and the target pressure ratio and the intake air flow rate are placed at point B, a rotational speed required to increase can be calculated from a difference between the turbo rotational speed at point A (current turbo rotational speed) and the turbo rotational speed at point B (target turbo rotational speed). The electric motor control unit 23 controls the electric motor 2c according to the rotational speed required to increase (for example, controls the magnitude of the voltage applied to the electric motor 2c), and performs control such that the turbo rotational speed becomes the target turbo rotational speed.

As described above, in the turbocharger system 1 according to the present embodiment, the high-pressure stage turbocharger 2 is configured by a power-assisted turbocharger including the electric motor 2c that assists a drive force of the high-pressure stage compressor 2b. The electric motor 2c is driven when the boost pressure is deficient with respect to the EGR amount that is set as the amount most capable of inhibiting the generation of NOx.

When the electric motor 2c is driven, a sufficient boost pressure can be obtained regardless of the operating condition. Therefore, a sufficient boost pressure can be ensured even in a low load zone where the exhaust energy is low, or even during a transient operation that is susceptible to the effect of the inertia of the turbine wheel. Therefore, a sufficient EGR amount can be ensured in all operating conditions, the EGR amount can always be set as the optimal EGR amount (most capable of inhibiting the generation of NOx), and NOx emission from the engine E can be reduced. As a result, expensive NOx catalyst can be simplified or abolished, and costs can be significantly reduced.

It is apparent that the present invention is not limited to the embodiment, and various modifications can be made without departing from the scope of the present invention.

For example, in the embodiment, the electric motor 2c is configured to be driven when the boost pressure measured by the boost pressure sensor 13 is lower than the target boost pressure obtained by the target boost pressure map 22, but the indicator of driving the electric motor 2c is not limited to the boost pressure. For example, the inlet-to-outlet pressure ratio of the high-pressure stage compressor 2b, an air excess ratio of exhaust or intake, an intake air amount, and the like may be set as the indicator, and the electric motor 2c may be configured to be driven when the actual measured value is less than the target value.

Also, a rotational speed sensor may be provided to detect the turbo rotational speed of the high-pressure stage turbocharger 2, and the assist amount by the electric motor 2c may be controlled according to a discrepancy between the turbo rotational speed detected by the rotational speed sensor and the target turbo rotational speed.

Furthermore, although not described in the embodiment, since both of the high-pressure stage turbine 2a and the high-pressure stage compressor 2b are rotated when the electric motor 2c is driven, the inlet pressure of the high-pressure stage turbine 2a is lowered, and the outlet pressure of the high-pressure stage compressor 2b is raised. Therefore, when the efficiency of the high-pressure stage turbocharger 2 is very high, a pressure difference between the intake passage 5 side and the exhaust passage 4 side of the EGR pipe 15 becomes small. Thus, a case where the EGR amount will not be much increased even when the EGR valve 16 is opened may be considered. In order to prevent this, a lead valve (one-way valve) allowing the exhaust gas to flow in only one direction from the exhaust side to the intake side may be provided in the EGR pipe 15, and the EGR amount may be ensured using pressure pulsation.

In the embodiment, the case where the series two-stage turbo is applied has been described as an example of the present invention, but the applicable scope of the present invention is not limited to the series two-stage turbo. For example, it is apparent that the present invention can also be applied to a turbocharger system including only one-stage turbocharger.

The invention claimed is:

1. A turbocharger system for an engine, comprising:
an exhaust gas recirculation controller configured to recirculate a part of exhaust gas discharged from the engine to an intake side, and control an amount of the exhaust gas recirculated to the intake side to inhibit generation of NOx regardless of an amount of oxygen necessary for combustion in the engine;
a power-assisted high-pressure stage turbocharger including a high-pressure stage turbine disposed on an exhaust passage of the engine and driven by the exhaust gas, a high-pressure stage compressor disposed on an intake passage of the engine and driven by a rotational torque of the high-pressure stage turbine, and an electric motor that assists a drive force of the high-pressure stage compressor;
a low-pressure stage turbocharger including a low-pressure stage turbine disposed on the exhaust passage of the engine at a more downstream side than the high-pressure stage turbine and driven by the exhaust gas, and a low-pressure stage compressor disposed on the intake passage of the engine at a more upstream side than the high-pressure stage compressor and driven by a rotational torque of the low-pressure stage turbine;
a boost pressure sensor that measures a boost pressure defined by an outlet pressure of the high-pressure stage compressor;
a target boost pressure map in which a target boost pressure is set for each speed and torque of the engine, considering an amount of the exhaust gas recirculated to the intake side by the exhaust gas recirculation controller;
an intake air flow rate measurement unit that measures an intake air flow rate;
an inlet pressure sensor that measures an inlet pressure of the high-pressure stage compressor;
a high-pressure stage compressor characteristics map that represents a relationship of a pressure ratio of the inlet pressure and the boost pressure with respect to the intake air flow rate for each turbo rotational speed in the high-pressure stage compressor; and
an electric motor controller configured to calculate a target pressure ratio from a ratio of the inlet pressure measured by the inlet pressure sensor and the target boost pressure, calculate a target turbo rotational speed by referring to the high-pressure stage compressor characteristics map at the target pressure ratio and the intake air flow rate measured by the intake air flow rate measurement unit, and control a drive amount of the electric motor according to a discrepancy between the calculated target turbo rotational speed and a current turbo rotational speed.

2. The turbocharger system according to claim 1, wherein the electric motor controller is further configured to drive the electric motor when the boost pressure defined by an outlet pressure of the high-pressure stage compressor is smaller than the target boost pressure set to a value to ensure power performance of a vehicle, even when the amount of the exhaust gas recirculated to the intake side by the exhaust gas recirculation controller is set at an amount that is most capable of inhibiting the generation of NOx.

3. The turbocharger system according to claim 1, wherein the electric motor controller is configured to calculate a current pressure ratio from a ratio of the inlet pressure measured by the inlet pressure sensor and the boost pressure measured by the boost pressure sensor, and calculate the current turbo rotational speed by referring to the high-pressure stage compressor characteristics map at the current pressure ratio and the intake air flow rate measured by the intake air flow rate measurement unit.

4. The turbocharger system according to claim 3, wherein the electric motor controller is configured to drive the electric motor when the engine speed is within a low speed range where the low-pressure stage turbocharger is not driven, and the inlet pressure sensor is disposed on the intake passage at a more upstream side than the low-pressure stage compressor.

* * * * *